United States Patent
Jeol

(10) Patent No.: US 10,077,332 B2
(45) Date of Patent: Sep. 18, 2018

(54) CURABLE COMPOSITION AND PROCESS FOR THE MANUFACTURE OF AN EPOXY THERMOSET

(71) Applicant: RHODIA OPERATIONS, Paris (FR)

(72) Inventor: Stephane Jeol, Cumming, GA (US)

(73) Assignee: Rhodia Operations, Paris (FR)

( * ) Notice: Subject to any disclaimer, the term of this patent is extended or adjusted under 35 U.S.C. 154(b) by 316 days.

(21) Appl. No.: 14/900,662

(22) PCT Filed: Jul. 3, 2014

(86) PCT No.: PCT/EP2014/064262
§ 371 (c)(1),
(2) Date: Dec. 22, 2015

(87) PCT Pub. No.: WO2015/001061
PCT Pub. Date: Jan. 8, 2015

(65) Prior Publication Data
US 2016/0152764 A1    Jun. 2, 2016

(30) Foreign Application Priority Data

Jul. 3, 2013   (EP) .................................... 13174829
Jul. 22, 2013  (EP) .................................... 13177442

(51) Int. Cl.
| | |
|---|---|
| C08G 59/50 | (2006.01) |
| C08K 5/1535 | (2006.01) |
| C08G 59/24 | (2006.01) |
| C09J 5/00 | (2006.01) |
| C09J 163/00 | (2006.01) |
| C08G 59/18 | (2006.01) |

(52) U.S. Cl.
CPC ....... *C08G 59/5046* (2013.01); *C08G 59/184* (2013.01); *C08G 59/245* (2013.01); *C08K 5/1535* (2013.01); *C09J 5/00* (2013.01); *C09J 163/00* (2013.01); *C09J 2463/00* (2013.01)

(58) Field of Classification Search
CPC .................................................. C08G 59/5046
See application file for complete search history.

(56) References Cited

U.S. PATENT DOCUMENTS

| | | | | | |
|---|---|---|---|---|---|
| 2,750,395 | A | * | 6/1956 | Phillips ................. | C07D 303/16 549/547 |
| 2,890,194 | A | * | 6/1959 | Phillips ................. | C08G 59/24 525/438 |
| 2,995,581 | A | * | 8/1961 | Garber ................. | C08G 59/5046 528/417 |
| 3,018,262 | A | * | 1/1962 | Schroeder .......... | C08G 59/4007 427/393.2 |
| 3,055,914 | A | * | 9/1962 | Garber ................. | C07D 307/12 549/472 |
| 4,981,926 | A | * | 1/1991 | Pham .................. | C08G 59/688 525/486 |
| 5,208,317 | A | * | 5/1993 | Pham .................. | C08G 59/688 525/486 |
| 5,405,688 | A | * | 4/1995 | Decker ................ | C08L 63/00 428/297.4 |
| 6,153,719 | A | * | 11/2000 | Abbey ................. | C08F 283/10 525/529 |
| 6,242,083 | B1 | * | 6/2001 | McGrail ............... | C08G 59/38 428/297.4 |
| 6,572,971 | B2 | * | 6/2003 | Martin ................. | B32B 7/12 428/414 |
| 6,632,893 | B2 | * | 10/2003 | Konarski ........... | C08G 59/4014 257/793 |
| 7,037,958 | B1 | * | 5/2006 | Hansen ................ | B05D 7/54 523/428 |
| 7,163,973 | B2 | * | 1/2007 | Ahsan ................. | C08G 59/621 257/789 |
| 2004/0169162 | A1 | * | 9/2004 | Xiao ................... | C08G 59/184 252/500 |
| 2005/0171237 | A1 | * | 8/2005 | Patel .................. | C09D 11/101 523/160 |
| 2006/0293172 | A1 | * | 12/2006 | Rubinsztajn ......... | B01J 31/0237 502/155 |
| 2009/0018300 | A1 | * | 1/2009 | Bloom .................. | C08G 61/12 527/102 |
| 2012/0232292 | A1 | | 9/2012 | Schaub et al. | |
| 2012/0232293 | A1 | | 9/2012 | Schaub et al. | |
| 2012/0232294 | A1 | * | 9/2012 | Schaub ............... | C07C 209/16 549/495 |
| 2014/0370298 | A1 | * | 12/2014 | Owusu-Adom ...... | C08L 63/00 428/414 |
| 2015/0203629 | A1 | * | 7/2015 | Ortelt ................. | C08K 5/1535 428/418 |
| 2016/0185896 | A1 | * | 6/2016 | Panchenko ......... | C08G 59/5046 523/400 |

FOREIGN PATENT DOCUMENTS

| | | |
|---|---|---|
| GB | 911221 A | 11/1962 |
| JP | 2015533880 A | 11/2015 |

OTHER PUBLICATIONS

Xiaodun He et al. "Evaluation of Furfurylamines as Curing Agents for Epoxy Resins", Journal of Polymer Science, Polymer Chemistry Edition, Interscience Publishers, New York, NY, US, vol. 30, No. 4, Mar. 30, 1992. pp. 533-542.*

* cited by examiner

*Primary Examiner* — Megan McCulley
(74) *Attorney, Agent, or Firm* — Thi D. Dang

(57) ABSTRACT

Curable composition comprising at least one epoxy resin and at least one curing agent selected from derivatives of 5-hydroxymethylfurfural. Curable dispersion, curable prepolymer composition and process for manufacturing it. Process for the manufacture of an epoxy thermoset, epoxy thermoset and method for adhering at least two substrates.

9 Claims, No Drawings

CURABLE COMPOSITION AND PROCESS FOR THE MANUFACTURE OF AN EPOXY THERMOSET

This application is a U.S. national phase entry under 35 U.S.C. § 371 of International Application No. PCT/EP2014/064262, filed on Jul. 3, 2014, which claims priority to European application No. 13174829.5 filed on Jul. 3, 2013 and to European application No. 13177442.4 filed on Jul. 22, 2013. The entire contents of these applications are incorporated herein by this reference.

This application claims priority to European application No. 13174829.5 filed on Jul. 3, 2013 and to European application No. 13177442.4 filed on Jul. 22, 2013, the whole content of these applications being incorporated herein by reference for all purposes.

The present invention relates to a curable composition, a curable dispersion, a curable prepolymer composition and a process for manufacturing it. The invention also relates to a process for the manufacture of an epoxy thermoset, preferably an epoxy/amine thermoset. The invention also relates to an epoxy thermoset, preferably an epoxy/amine thermoset and to a method for adhering at least two substrates.

Thermoset materials represent a certain amount of the plastics production used in the industry. Examples of thermosets are phenolic and urea formaldehyde resins, unsaturated polyesters and epoxy resins. Epoxy resins account for approximately 70% of the market of the thermosets, polyurethanes excluded.

Epoxy resins may be reacted (cross-linked) either with themselves or with a wide range of co-reactants including polyfunctional amines, acids (and acid anhydrides), phenols, alcohols, and thiols. These co-reactants are often referred to as hardeners or curing agents and the cross-linking reaction is commonly referred to as curing. Reaction of epoxy resins with themselves or with polyfunctional hardeners forms the cured thermosets often with strong mechanical properties as well as high temperature and chemical resistance.

The global epoxy thermosets production was estimated to 2 million tons in 2010 and is projected to reach 3 million tons by the year 2017.

The co-reactants which are used nowadays for the curing reaction of epoxy resins are commonly organic compounds produced industrially from petroleum-based raw materials and therefore organic compounds from fossil origin.

Due to the increasing production of epoxy thermosets as well as the uncertainty in terms of price and availability of petroleum and to the increasing pressure put on sustainable development, the chemical industry is facing an increasing demand for developing the synthesis and the use of bio-based chemicals i.e. chemicals synthesized from renewable resources, in particular to be used as epoxy curing agents. In the market of epoxy thermosets, there is therefore an urgent need in getting bio-based curing agents for the replacement of fossil curing agents.

2,5-furandicarboxylic acid (FDCA) is one of the chemicals which can be produced on the basis of sugars and other, non-food, carbohydrates and therefore presents itself as a good candidate as bio-based epoxy curing agent. However, this chemical compound presents the disadvantages of leading in certain conditions to the generation of degraded compounds which present themselves as toxic and FDCA is therefore not acceptable in such use. It therefore still remains a need in getting bio-based curing agents which do not lead to inacceptable by-products.

The Applicant has found in this context derivatives of 5-hydroxymethylfurfural (HMF) which itself can be prepared from $C_6$ carbohydrate resources, in particular from glucose, which can be used as epoxy resin curing agents for the manufacture of epoxy thermosets and which do not lead to the generation of toxic by-products.

The invention therefore concerns mainly a curable composition comprising
(a) at least one curing agent selected from the derivatives of 5-hydroxymethylfurfural responding to formula I and to formula II

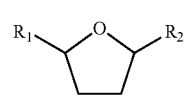

Formula I

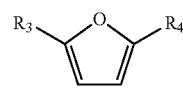

Formula II in which
$R_1$ and $R_2$ are selected from $-(CH_2)_n-NH_2$, $-COOH$,

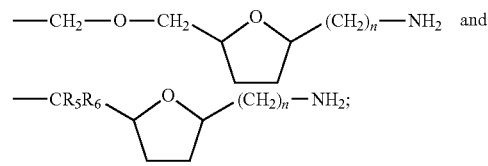

$R_3$ is selected from $-(CH_2)_n-NH_2$, $-COOH$,

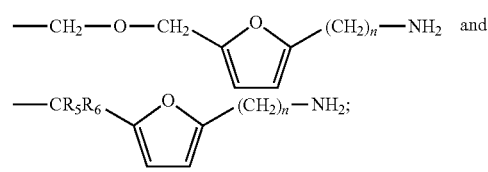

$R_4$ is selected from $-(CH_2)_n-NH_2$,

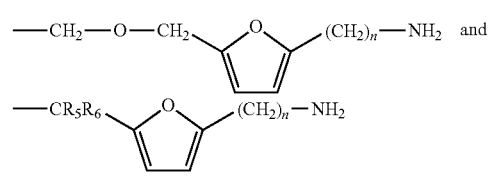

$R_5$ and $R_6$ are selected from $-H$, $-CH_3$, $-C_2H_5$, $n-C_3H_7$; and
n is equal to 1, 2 or 3;
and
(b) at least one epoxy resin.

By at least one curing agent (a), it is meant, according to the present invention, that the curable composition and the curable dispersion according to the invention can contain one or more than one curing agents. In a preferred embodiment, curing agent (a) is the sole curing agent. In the present description, the term "curing agent (a)" is used in the singular and in the plural indiscriminately.

Curing agent (a) is advantageously selected from the following derivatives of 5-hydroxymethylfurfural derivatives of 5-hydroxymethylfurfural responding to formula I in which R₁ and R₂ are both equal to —(CH₂)ₙ—NH₂;

derivative of 5-hydroxymethylfurfural responding to formula I in which R₁ and R₂ are both equal to —COOH;

derivatives of 5-hydroxymethylfurfural responding to formula I in which R₁ is equal to —(CH₂)ₙ—NH₂ and R₂ is equal to —COOH;

derivatives of 5-hydroxymethylfurfural responding to formula I in which R₁ is equal to —(CH₂)ₙ—NH₂ and R₂ is equal to

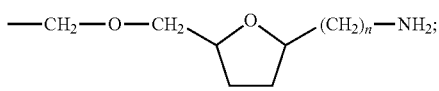

derivatives of 5-hydroxymethylfurfural responding to formula II in which R₃ and R₄ are both equal to —(CH₂)ₙ—NH₂;

derivatives of 5-hydroxymethylfurfural responding to formula II in which R₃ is equal to —(CH₂)ₙ—NH₂ and R₄ is equal to —COOH; and derivatives of 5-hydroxymethylfurfural responding to formula II in which R₃ is equal to —(CH₂)ₙ—NH₂ and R₄ is equal to

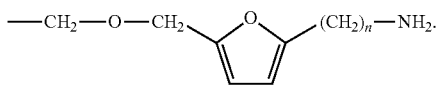

Curing agent (a) is preferably selected from the following derivatives of 5-hydroxymethylfurfural derivatives of 5-hydroxymethylfurfural responding to formula I in which R₁ and R₂ are both equal to —(CH₂)ₙ—NH₂;

derivatives of 5-hydroxymethylfurfural responding to formula I in which R₁ is equal to —(CH₂)ₙ—NH₂ and R₂ is equal to —COOH;

derivatives of 5-hydroxymethylfurfural responding to formula II in which R₃ and R₄ are both equal to —(CH₂)ₙ—NH₂, and derivatives of 5-hydroxymethylfurfural responding to formula II in which R₃ is equal to —(CH₂)ₙ—NH₂ and R₄ is equal to —COOH.

Curing agent (a) is more preferably selected from the derivatives of 5-hydroxymethylfurfural responding to formula I and to formula II in which n is equal to 1.

A particular preference is given to curing agent (a) selected from the derivatives of 5-hydroxymethylfurfural responding to formula I and to formula II in which R₁, R₂, R₃ and R₄ all bear —NH₂ group(s). Epoxy/amine thermosets are therefore preferably obtained.

Curing agent (a) is particularly more preferably selected from 2,5-bis(aminomethyl)furan (named "FDA" for "Furane DiAminomethyl"), 2,5-bis(aminomethyl)tetrahydrofuran (named "THFDA" for "TetraHydroFuraneDiAminomethyl") as represented by the formulas below, and mixtures thereof.

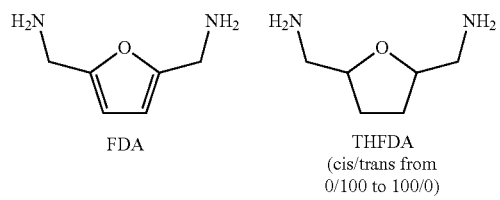

Curing agent (a) is most preferably selected from FDA and THFDA. FDA, on one side, and THFDA, on the other side, are the particularly most preferred curing agent (a).

Cis isomer or trans isomer of THFDA or mixtures thereof can be considered.

The derivatives of 5-hydroxymethylfurfural (HMF) according to the invention are advantageously bio-based chemicals according to ASTM D6866. They advantageously contain a high proportion of ¹⁴C. This characteristic can be determined according to one of the methods described in ASTM D6866, notably according to mass spectrometry or by liquid scintillation counting.

Curing agent (a) according to the invention, most preferably THFDA and/or FDA, can be used alone or in combination with other conventional curing agent(s) such as polyamine (aliphatic, cyclo aliphatic, arylaliphatic, aromatic) and/or polycarboxylic acid (aliphatic, cyclo aliphatic, aromatic, arylaliphatic).

Conventional curing agents are usually polyamines with at least 2 nitrogen atoms per molecule and at least two reactive amine hydrogen atoms per molecule. The nitrogen atoms are advantageously linked by divalent hydrocarbyl groups. Other hydrocarbyl groups such as aliphatic, cycloaliphatic or aromatic groups may also be singly linked to some of the nitrogen atoms. These polyamines contain advantageously at least 2 carbon atoms per molecule. Preferably polyamines contain about 2 to about 6 amine nitrogen atoms per molecule, 2 to about 8 amine hydrogen atoms per molecule, and 2 to about 50 carbon atoms.

Examples of the polyamines useful as conventional curing agents for epoxy resins include methylene polyamines, ethylene polyamines, butylene polyamines, propylene polyamines, pentylene polyamines, hexylene polyamines, heptylene polyamines, etc. The higher homo logs of such amines and related aminoalkyl-substituted piperazines are also included.

Specific examples of such polyamines include aliphatic polyamines such as trimethylene diamine, di(trimethylene) triamine, hexamethylene diamine, dihexamethylene triamine, diheptamethylene triamine, octamethylene diamine, decamethylene diamine, ethylene diamine, diethylene triamine, triethylene tetramine, tetraethylene pentamine, pentaethylene hexamine, tris(2-aminoethyl)-amine, dipropylene triamine, tripropylene tetramine, 1,2-propane diamine, 1,3-propane diamine, 1,2-butane diamine, 1,3-butane diamine, 1,4-butane diamine, tributylene tetramine, 1,5-pentane diamine, 2-methyl-1,5-pentanediamine, 1,6-hexane diamine, 2,5-dimethyl-2,5-hexanediamine, pentaethylenehexamine and the like; cycloaliphatic polyamines such as isophoronediamine, 4,4'-diaminodicyclohexylmethane, 1,2-diaminocyclohexane, 1,3-diaminocyclohexane, 1,4-diaminocyclohexane; and diamines derived from "dimer acids" (dimerized fatty acids) which are produced by condensing the dimeracids with ammonia and then dehydrating and hydrogenating (for instance product PRIPOL® from CRODA); adducts of amines with epoxy resins such as an adduct of isophoronediamine with a diglycidyl ether of a dihydric phenol, or corresponding adducts with ethylenediamine or m-xylylenediamine; arylaliphatic polyamines such as 1,3-bis(aminomethyl)benzene, 1,4-bis(aminomethyl)benzene; aromatic polyamines such as 4,4'-methylenedianiline, 1,3-phenylenediamine, 1,4-phenylenediamine, 2,4-toluenediamine, 2,6-toluenediamine and 3,5-diethyl-2,4-toluenediamine; amidoamines such as condensates of fatty acids with diethylenetriamine, triethylenetetramine, etc; polyamides such as condensates of dimer acids with diethylenetriamine, triethylenetetramine; polymethylene polyphenylpolyamine, and mixtures thereof. Higher homo logs, obtained by condensing two or more of the above-illustrated alkylene amines, are also useful.

Some commercial examples of polyamines include EPI-CURE® Curing Agent 3140 (a dimer acid-aliphatic polyamine adduct), EPICURE® Curing Agent 3270 (a modified aliphatic polyamine), EPICURE® Curing Agent 3274 (a modified aliphatic polyamine), EPICURE® Curing Agent 3295 (an aliphatic amine adduct),EPICURE® Curing Agent 3282 (an aliphatic amine adduct), EPICURE® Curing Agent 3055 (an amidopolyamine),EPICURE® Curing Agent 3046 (an amidopolyamine) and EPICURE® Curing Agent 3072 (modified amidoamine), and EPICURE® Curing Agent 3483 (an aromatic polyamine) available from Shell Chemical Company. Mixtures of polyamines may also be used.

Among the above-cited other aliphatic amine curing agents that may be used in conjunction with curing agent (a) according to the invention, most preferably FDA and/or THFDA, preferred are amines such as $C_{4-15}$ aliphatic and cycloaliphatic diamines and polyamines such as 2-methyl-1,5-pentanediamine, 1,2-diaminocyclohexane, triethylenetetramine, diethylenetriamine, 1,4- or 1,3-diaminocyclohexane, isophoronediamine, 1,3-bis(aminomethyl)benzene, isomeric mixtures of bis(4-aminocyclohexyl)methane, oligo (propylene oxide)diamine, 1,3 and 1,4-bis(aminomethyl) cyclohexane and adducts of the above amines with epoxy resins, epichlorohydrin, acrylonitrile, ethyleneoxide, and the like.

Other curing agents that may be used in conjunction with curing agent (a) according to the invention, most preferably FDA and/or THFDA, may include phosphines, quaternary ammonium and phosphonium salts, such as tetraethylammonium chloride, tetraethylammonium bromide, tetraethylammonium iodide, tetraethylammonium hydroxide, tetra(n-butyl)ammonium chloride, tetra(n-butyl)ammonium bromide, tetra(n-butyl)ammonium iodide, tetra(n-butyl)ammonium hydroxide, tetra (noctyl)ammonium chloride, tetra (n-octyl)ammonium bromide, tetra(n-octyl)ammonium iodide, tetra(n-octyl)ammonium hydroxide, methyltris(n-octyl)ammonium chloride, bis{tetraphenylphosphoranylidene) ammonium chloride, ethyltri-p-tolylphosphoniumacetate/ acetic acid complex, ethyltriphenylphosphonium acetate/ acetic acid complex or combinations thereof and the like as described in U.S. Pat. Nos. 5,208,317, 5,109,099 and 4,981, 926.

Other curing agents known to those skilled in the art may also be used in combination with the above described amines.

The curing agent(s) may be present in the curable composition and in the curable dispersion according to the invention in an amount effective to cure the epoxy resin, generally an amount within the range of about 0.5 to about 2 equivalents, based on the epoxy resin.

The amount of other conventional curing agents admixed will depend upon the requirements placed upon the end product and the efficiencies one desires to achieve. If the end use does not require a product which has high end physical properties and/or it is not important to have lowered processing times, then greater amounts of an inexpensive conventional curing agent can be mixed with the curing agent (a) according to the invention.

The amount of the curing agent (a) according to the invention is comprised advantageously between 1 and 100, preferably between 25 and 100, more preferably between 50 and 100, most preferably between 75 and 100, and is particularly most preferably 100 wt % of all curing agents.

By at least one epoxy resin (b), it is meant, according to the present invention, that the curable composition and the curable dispersion according to the invention can contain one or more than one epoxy resins. In a preferred embodiment, the curable composition and the curable dispersion according to the invention contain only one epoxy resin (b). In the present description, the above terms are used in the singular and in the plural indiscriminately.

The term "epoxy resin", also called "polyepoxide" or simply "epoxy", is understood to mean, for the purposes of the present invention, monomers, low molecular weight oligomers or higher molecular weight polymers containing at least two epoxide (also called oxirane, glycidyl or epoxy) groups.

The epoxy resins used in embodiments disclosed herein may vary and include conventional and commercially available epoxy resins, which may be used alone or in combinations of two or more, including, for example, novolac resins, isocyanate modified epoxy resins, and carboxylate adducts, among others. In choosing epoxy resins for compositions disclosed herein, consideration should not only be given to properties of the final product, but also to viscosity and other properties that may influence the processing of the resin composition.

Epoxy resins useful in embodiments disclosed herein may include monofunctional epoxy resins, multi- or poly-functional epoxy resins, and combinations thereof. Epoxy resins may be aliphatic, cycloaliphatic, aromatic or heterocyclic epoxy resins. The polymeric epoxies include linear polymers having terminal epoxy groups (a diglycidylether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking In general, the epoxy resins may be glycidated resins, cycloaliphatic resins, epoxidized oils, and so forth. The glycidated resins are frequently the reaction product of a glycidyl ether, such as epichlorohydrin, and a bisphenol compound such as bisphenol A; $C_4$ to $C_{28}$ alkyl glycidyl ethers; $C_2$ to $C_{28}$ alkyl- and alkenyl-glycidyl esters; $C_1$ to $C_{28}$ alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenylcyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidylethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane bisphenol A diglycidyl ether.

In some embodiments, the epoxy resin may include glycidyl ether type; glycidyl-ester type; alicyclic type; heterocyclic type, and halogenated epoxy resins, etc. Non-limiting examples of suitable epoxy resins may include cresol novolac epoxy resin, phenolic novolac epoxy resin, biphenyl epoxy resin, hydroquinone epoxy resin, stilbene epoxy resin, and mixtures and combinations thereof.

Suitable polyepoxy compounds may include resorcinol diglycidyl ether (1,3-bis-(2,3-epoxypropoxy)benzene), diglycidyl ether of bisphenol A (2,2-bis(p-(2,3-epoxypropoxy)phenyl)propane), triglycidyl p-aminophenol (4-(2,3-epoxypropoxy)-N,N-bis(2,3-epoxypropyl)aniline), diglycidyl ether of bromobisphenol A (2,2-bis(4-(2,3-epoxypropoxy)3-bromophenyl)propane), diglycidyl ether of bisphenol F (2,2-bis(p-(2,3-epoxypropoxy)phenyl)methane), triglycidyl ether of meta and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins may be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl) propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy naphthalene; modified epoxy resins with acrylate or urethane moieties; glycidylamineepoxy resins; and novolac resins.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194.

Further epoxy-containing materials which are particularly useful include those based on glycidyl ether monomer.

Examples are di- or polyglycidyl ethers of polyhydric phenols obtained by reaction of a polyhydric phenol with an excess of chlorohydrin such as epichlorohydrin. Such polyhydric phenols include resorcinol, bis(4-hydroxyphenyl) methane (known as bisphenol F), 2,2-bis(4-hydroxyphenyl) propane (known as bisphenol A), 2,2-bis(4'-hydroxy-3',5'-dibromophenyl)propane, 1,1,2,2-tetrakis(4'-hydroxyphenyl)ethane or condensates of phenols with formaldehyde that are obtained under acid conditions such as phenol novolacs and cresol novolacs. Examples of this type of epoxy resin are described in U.S. Pat. No. 3,018,262. Other examples include di- or polyglycidyl ethers of polyhydric alcohols such as 1,4-butanediol, or polyalkylene glycols such as polypropylene glycol and di- or polyglycidyl ethers of cycloaliphatic polyolssuch as 2,2-bis(4-hydroxycyclohexyl)propane. Other examples are monofunctional resins such as cresol glycidyl etheror butyl glycidyl ether.

Another class of epoxy compounds is polyglycidyl esters and poly(beta-methylglycidyl) esters of polyvalentcarboxylic acids such as phthalic acid, terephthalic acid, tetrahydrophthalic acid or hexahydrophthalic acid. A further class of epoxy compounds are N-glycidyl derivatives of amines, amides and heterocyclic nitrogen bases such as N,Ndiglycidylaniline, N,N-diglycidyl toluidine, N,N,N',N'-tetraglycidyl bis(4-aminophenyl)methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methyl-methacrylateglycidylacrylate and a 62.5:24:13.5 methylmethacrylate-ethyl acrylate-glycidylmethacrylate. Epoxy compounds that are readily available include octadecylene oxide; glycidylmethacrylate; D.E.R. 331 (bisphenol A liquid epoxy resin), and D.E.R. 332 (diglycidyl ether of bisphenol A) available from The Dow Chemical Company, Midland, Mich.; vinylcyclohexene dioxide; 3,4-epoxycyclohexylmethyl-3,4-epoxycyclohexane carboxylate; 3,4-epoxy-6-methylcyclohexylmethyl-3,4-epoxy-6-methylcyclohexane carboxylate; bis(3,4-epoxy-6-methylcyclohexylmethyl)adipate; bis(2,3-epoxycyclopentyl) ether; aliphatic epoxy modified with polypropylene glycol; dipentene dioxide; epoxidized polybutadiene; silicone resin containing epoxy functionality; flame retardant epoxy resins (such as a brominated bisphenol type epoxy resin available under the tradename D.E.R. 580, available from The Dow Chemical Company, Midland, Mich.); 1,4-butanediol diglycidyl ether of phenol-formaldehyde novolac (such as those available under the tradenames D.E.N. 431 and D.E.N. 438 available from The Dow Chemical Company, Midland, Mich.); and resorcinol diglycidyl ether. Although not specifically mentioned, other epoxy resins under the tradename designations D.E.R. and D.E.N. available from the Dow Chemical Company may also be used.

Epoxy resins may also include isocyanate modified epoxy resins. Polyepoxide polymers or copolymers with isocyanate or polyisocyanate functionality may include epoxy-polyurethane copolymers. These materials may be formed by the use of a polyepoxide prepolymer having one or more oxirane rings to give a 1,2-epoxy functionality and also having open oxirane rings, which are useful as the hydroxyl groups for the dihydroxyl-containing compounds for reaction with diisocyanate or polyisocyanates. The isocyanate moiety opens the oxirane ring and the reaction continues as an isocyanate reaction with a primary or secondary hydroxyl group. There is sufficient epoxide functionality on the polyepoxide resin to enable the production of an epoxy polyurethane copolymer still having effective oxirane rings. Linear polymers may be produced through reactions of diepoxides and diisocyanates. The di- or polyisocyanates may be aromatic or aliphatic in some embodiments.

Other suitable epoxy resins are disclosed in, for example, U.S. Pat. Nos. 7,163,973, 6,632,893, 6,242,083, 7,037,958, 6,572,971, 6,153,719, and 5,405,688 and U.S. Patent Application Publication Nos. 20060293172 and 20050171237, each of which is hereby incorporated herein by reference.

Other epoxy resins can be 2,5-bis((oxiran-2-ylmethoxy)methyl)furan obtained by reaction of 1 mol of furan-2,5-dimethanol with 2 mol of epichlorhydrin and can be 2,5-bis((oxiran-2-ylmethoxy)methyl)-tetrahydrofuran obtained by reaction of 1 mol of tetrahydrofuran-2,5-dimethanol with 2 mol of epichlorhydrin.

The amount of epoxy resins used in the curable composition and in the curable dispersion according to the invention may depend on the targeted molecular weight and epoxy functionality. In some embodiments, the epoxy resin may be used in an amount of from about 30 wt. % to about 85 wt. %, based on the total weight of the curable composition/dispersion. In other embodiments, the epoxy resin may be used in the curable composition/dispersion in an amount from about 40 wt. % to about 75 wt. %; and from about 45 wt. % to about 70 wt. % in yet other embodiments, based on the total weight of the curable composition/dispersion.

The ratio of epoxy resin to the curing agent may range from about 10:90 to about 90:10 in some embodiments; and from about 20:80 to about 80:20 by weight percent in yet other embodiments.

In other embodiments, the curing agent (a) and the epoxy resin (b) described herein may form part of water-based and oil-based dispersions.

Another object of the present invention is therefore a curable dispersion comprising at least one curing agent (a), at least one epoxy resin (b) and at least one dispersing agent.

The definitions, characteristics and preferences in relation to curing agent (a) and epoxy resin (b) described above for the curable composition according to the invention apply mutadis mutandis to the curable dispersion according to the invention.

By at least one dispersing agent, it is meant, according to the present invention, that the curable dispersion according to the invention can contain one or more than one dispersing agents. In a preferred embodiment, the curable dispersion according to the invention contains only one dispersing agent. In the present description, the term "dispersing agent" is used in the singular and in the plural indiscriminately.

The dispersing agent can be any dispersing agents that can allow to obtain water-based and oil-based dispersions. Advantageously, the dispersing agent is water or any organic solvent chemically inert with amine and epoxy functions. Preferably, the dispersing agent is water. The curable dispersion is therefore preferably a curable water dispersion. Such curable water dispersion may be used for can and coil coating preparation.

Another object of the present invention is a curable prepolymer composition comprising a prepolymer which is the reaction product of at least one epoxy resin (b) with at least one curing agent (a) according to the invention.

The definitions, characteristics and preferences in relation to curing agent (a) and epoxy resin (b) described above for the curable composition according to the invention apply mutadis mutandis to the curable prepolymer composition according to the invention.

The curable prepolymer composition according to the present invention can be prepared by any process. Such composition is preferably prepared by the process for the manufacture of at least one curable prepolymer composition according to the invention.

Another object of the present invention is therefore a process for the manufacture of at least one curable prepolymer composition comprising the reaction of at least one curing agent (a) with at least one epoxy resin (b).

The definitions, characteristics and preferences in relation to curing agent (a) and epoxy resin (b) described above for the curable composition according to the invention apply mutadis mutandis to the process for the manufacture of at least on curable prepolymer composition according to the invention.

The present invention also relate to a process for the manufacture of an epoxy thermoset comprising the reaction of at least one curing agent (a) or of at least one curable prepolymer composition according to the invention or prepared by the process according to the invention, with at least one epoxy resin (b).

The invention also concerns an epoxy thermoset obtainable by reaction of at least one curing agent (a) or of at least one curable prepolymer composition according to the invention or prepared by the process for the manufacture of at least one curable prepolymer composition according to the invention, with at least one epoxy resin (b).

The epoxy thermoset can be obtained by any process. The epoxy thermoset is preferably obtained by the process for the manufacture of an epoxy thermoset according to the invention.

The definitions, characteristics and preferences in relation to curing agent (a) and epoxy resin (b) described above for the curable composition according to the invention apply mutadis mutandis to the process for the manufacture of an epoxy thermoset and to the epoxy thermoset according to the invention.

The term "thermoset", also called thermosetting polymer/resin, is understood to mean, for the purposes of the present invention, a polymer/resin in a soft solid or viscous state that changes irreversibly into an infusible, insoluble polymer network by curing and which, once hardened, cannot be reheated and melted back to a liquid form.

The reaction referred to in the process for the manufacture of at least one curable prepolymer composition according to the invention or in the process for the manufacture of an epoxy thermoset according to the invention is preferably a curing reaction.

Curing can be induced by the action of heat or of irradiation as well as through a chemical reaction.

The temperature at which the curing reaction may be conducted may depend on the specific compositions. The temperature at which curing reaction can be operated is advantageously comprised between −40° C. and 200° C., preferably between −25° C. and 200° C., more preferably between 15° C. and 180° C., most preferably between 30° C. and 160° C. and particularly most preferably between 50° C. and 150° C.

The curing reaction can be operated at the previously mentioned curing temperatures for a time effective to cure the epoxy resin. In some embodiments, the curing time may be less than 72 hours. In other various embodiments, the curing time may be less than 48 hours, less than 24 hours, less than 16 hours, less than 12 hours, less than 10 hours, less than 8 hours, less than 6 hours, less than 4 hours, and less than 2 hours. In other embodiments, the curing time may be less than 60 minutes, less than 45 minutes, or less than 30 minutes.

The curing reaction can occur in the presence of several additional components among which accelerators, solvents, catalysts and additives.

An accelerator may optionally be included to increase the cure rate of the epoxy resin-curing agent system. Various amine-compatible accelerators may be used as long as they are soluble in the curing agents. One specific accelerator that may be used in embodiments of the present invention is benzyl alcohol. Examples of accelerators include metal salts such as, for example, sulfonates, phosphonates, sulfates, tetrafluoroborates, carboxylates and nitrates of Groups IA, IIA and transition metal series of the Periodic Table, preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; hydroxyl compounds such as benzyl alcohol; imidazoles; cyanamide compounds such as dicyandiamide and cyanamide; sulfonamides such as, for example p-toluenesulfonamide, methanesulfonamide, N-methylbenzenesulfonamideand sulfamide; and imides such as, for example, phthalimide, succinimide, perylenetetracarboxylic diimide and saccharin.

In some embodiments, an accelerator may be included such as when the cure rate at the desired temperature is suboptimal. For example, for adhesive applications and civil engineering applications where application at low temperature is desired, it may be beneficial to include an accelerator. As another example, an accelerator may be included where the hardening composition includes hindered amine groups or where the concentration of amine groups is low.

In other embodiments, accelerators may include, for example, calcium alkylbenzenesulfonates, calcium nitrate, magnesium alkanesulfonates, tetrafluoroboric acid, salicylic acid, phenol, dichloroacetic acid, trifluoroacetic acid, and mercaptoacetic acid. In other embodiments, accelerators may include triphenylphosphine, tributylphosphine, tri(p-methylphenyl)phosphine, tri(nonylphenyl)phosphine, triphenylphosphine-triphenylborate, tetraphenylphosphine-tetraphenylborate, or a similar phosphorous-type compound; a triethylamine, benzidyldimethylamine, alpha-methybenzidyldimethylamine, 1,8-diazabicyclo{5.4.0} undec-7-ene, or a similar tertiary amine compound; 2-methylimidazol, 2-phenyl imidazole, 2-phenyl-4-methylimidazole, or a similar imidazole type compound.

Accelerators may be used in some embodiments in an amount from about 0.1 weight percent to about 20 weight percent based on the epoxy resin. In other embodiments, accelerators may be used in an amount from about 0.1 weight percent to about 5 weight percent, based on the epoxy resin.

Suitable solvents which may be employed herein include, for example, alcohols, aliphatic hydrocarbons, aromatic hydrocarbons, glycol ethers, amides, sulfoxides, sulfones, combinations thereof and the like. Particularly suitable solvents include, for example, methanol, ethanol, isopropanol, hexane, heptane, octane, nonane, decane, toluene, xylene, ethylene glycol methyl ether, ethylene glycol ethyl ether, ethylene glycol n-butyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrolidinone, N,N-dimethylacetamide, dimethylsulfoxide, sulfo lane, combinations thereof and the like.

The solvent may be used, in some embodiments, in amounts from about 5 to about 95 percent by weight based upon the combined weight of the solvent, epoxy resin and the curing agent. In other embodiments, the solvent may be used in amounts from about 20 to about 60 weight percent; and from about 30 to about 40 weight percent in yet other embodiments, where the percent by weight is based upon the combined weight of solvent, epoxy resin and the curing agent.

Catalysts may include imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them by deformaldehyde reaction, e.g., 4,4'-methylene-bis-(2-ethyl-5-methylimidazole), and the like.

The curable compositions/dispersions of the invention may include other additives, such as fillers, elastomers, stabilizers, extenders, plasticizers, accelerators, pigments, reinforcing agents, flow control agents and flame retardants depending on the application. If necessary, the compositions/dispersions of the invention may be combined with a thermoplastic resin, thermoplastic elastomer, organic synthetic rubber, silicone-type, or a similar stress lowering agent; a carnauba wax, higher fatty acids, synthetic waxes, or similar waxes; carbon black, or a similar coloring agent; halogen trap agents, etc. The curable compositions/dispersions disclosed herein may be used in coatings and certain civil engineering applications such as for floor topping, grouts and adhesives.

For coating applications, the curable compositions/dispersions may also contain pigments of the conventional type such as iron oxides, lead oxides, strontium chromate, carbon black, titanium dioxide, talc, barium sulfate, phthalocyanine blue and green, cadmium red, chromic green, lead silicate, silica, silicates and the like. Such pigments may be added to the curing agent component or the epoxy resin component prior to mixing them together. However, iron blue pigment, calcium carbonate and pigments considered reactive because of their basic nature may not be compatible in the curable compositions/dispersions when used in appreciable quantities. These normally are added to the curing agent component only. Defoamers, tints, slip agents, thixotropes, etc., are common auxiliary components to most coatings and may be employed in the epoxy resin compositions/dispersions of the present invention. The amount of additive used may range from 20 to 100 parts by weight based on the total weight of the epoxy resin and the curing agent.

For floor topping application, the epoxy resin component or the curing agent may also contain fillers such as sand, other siliceous materials, iron or other metals. Small amounts of thixotropic agents, coloring agents, inert plasticizers, and leveling agents may also be incorporated in the curable compositions/dispersions if desired. These curable flooring compositions may be trowelled, sprayed, or brushed on to a floor substrate.

Reinforcing agents may be added to either of the components, epoxy or curing agent, and include natural and synthetic fibers in the form of woven, mat, monofilament, chopped fibers, and the like. Other materials for reinforcing include glass, ceramics, nylon, rayon, cotton, aramid, graphite and combinations thereof. Suitable fillers include inorganic oxides, inorganic carbonates, ceramic microspheres, plastic microspheres, glass microspheres, clays, sand, gravel and combinations thereof. The fillers can be used in amounts suitably from 0 to 100 parts by weight of the combined amount of the epoxy and the curing agent.

The polymeric binder may include a wide variety of other additives such as, for example, hardeners, dyes, pigments and flow modifiers, fire-retardants, self extinguishing agents, desiccants and all manner of additives which are used herein for their known purposes. Examples of fire retardants include: monoammonium phosphate, diammonium phosphate, and aluminum trihydrate. These additives may be in the form of liquids or particles so long as the binder remains solid, has the desired particle size, and impart no adverse effects to the binder.

The curable compositions/dispersions according to the invention include a curing agent which can be prepared from $C_6$ carbohydrate resources, in particular from glucose. Because of the particular nature of the curing agent, the curable compositions/dispersions according to the invention can be used for the manufacture of epoxy thermosets which do not lead to the generation of toxic by-products. The curable compositions/dispersions according to the invention provide advantageously an interesting bio-based alternative to fossile MXDA. The curable compositions/dispersions according to the invention allow advantageously for the manufacture of epoxy thermosets exhibiting a high glass transition temperature. The curable compositions/dispersions according to the invention allow advantageously for the manufacture of epoxy thermosets exhibiting a low water absorption.

Finally, the present invention related to a method for adhering at least two substrates comprising
    applying the curable composition according to the invention, the curable dispersion according to the invention or the curable prepolymer composition according to the invention, to one or both of the substrates; and
    bringing the substrates into a contacting relationship.

This method according to the invention preferably further comprises curing the epoxy resin.

The conditions at which the curing occurs are the ones defined above.

More preferably the curing is made at a temperature comprised between −25° C. and 200° C.

The curable compositions/dispersions according to the invention described above may also be used as a coating, and may be applied to a substrate by brush, spray, or rollers. Aside from coating applications, the curing agent compositions/dispersions of the invention may be used in such applications as flooring, casting, crack or defect repair, molding, adhesives, potting, filament winding, encapsulation, structural and electrical laminates, composites and the like.

The curable compositions/dispersions may be used in a variety of industrial applications or other epoxy applications such as coatings, laminates and composites. Industrial coatings are surface protective coatings (paint coatings) applied to substrates that are cured/crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing/crosslinking, the polymeric binder hardens and functions as a binder for the pigments and provides adhesion of the dried paint film to the substrate. The pigments may be organic or inorganic and may functionally contribute to opacity and color in addition to durability and hardness.

Powder paints may be obtained which comprise the curable compositions/dispersions described herein, and suitable pigments, catalysts and additives: These powder paints and coatings there from may have a surprisingly good combination of properties. Depending on the choice and the amount of epoxy, curing agent, and other optional components, powder paints derived there from may have good flow, good chemical resistance, high gloss, high scratch resistance, good mechanical properties, good outdoor durability and good color stability.

The curable compositions/dispersions according to the invention may be used for structural applications and may contain epoxy resins based on or containing diglycidyl ethers of dihydric phenols, a curing agent containing curing agent (a) as described above, and an aliphatic alcohol-alkylene oxide adduct diluent. The curable compositions/dispersions used for coating applications may contain diglycidyl ethers of dihydric phenols, and/or the fusion products of the diglycidyl ethers of dihydric phenols with bisphenols, a curing agent containing curing agent (a) as described above, and an aliphatic alcoholalkylene oxide adduct diluent. The epoxy resin maybe blended or mixed with the diluent-containing curing agent or blended with a prepolymer derived from the curing agent, the aliphatic alcoholalkylene oxide adduct and optionally the accelerator simultaneously or in any order at a temperature below the cure temperature, such as below about 100° C., for example.

In other embodiments, the curable compositions/dispersions may be used in marine coatings, protective coatings, civil engineering applications, adhesives, and as one component of a composite. For example, composites formed using the curable compositions/dispersions disclosed herein may be used in windmill blades and other applications. In some embodiments, the epoxy resins used for these various applications may include a diglycidyl-ether of Bisphenol A, a diglycidyl-ether of Bisphenol F, or epoxy phenolic novolac resin.

The following examples are intended to illustrate the invention without however limiting the scope thereof.

Synthesis of 2,5-bis(aminomethyl)tetrahydrofuran (THFDA).

2,5-bis(aminomethyl)tetrahydrofuran (THFDA) was synthesized according to the following scheme:

Starting molecule was tetrahydrofuran-2,5-dimethanol, synthesized by reaction in methanol of 5-(Hydroxymethyl) furfural (HMF) with Raney nickel (1.5 mol for 1 mol of HMF) under pressure (5.84 bars $H_2$ and 60° C. during 20 hours), then filtrated and purified by distillation. Pale yellow liquid was obtained and had a purity higher than 98% (determined by chromatography/mass spectroscopy). Yield: 95%.

Mesyl chloride (307.8 g, 2.7 mol) was added dropwise to a cooled solution of tetrahydrofuran-2,5-dimethanol (118.8 g, 900 mmol) and triethylamine (454.5 g, 4500 mmol) in 1.54 L of dichloromethane at 0° C. The mixture was stirred at 0° C. for about 1 h. The reaction mixture was poured into ice-water and washed with diluted HCl solution, aqueous $NaHCO_3$ solution, and brine, dried, and concentrated to give 236.7 g of (tetrahydrofuran-2,5-diyl)bis(methylene) dimethanesulfonate as yellow oil of 96% purity (determined by LC/MS). Yield: 91%.

A solution of (tetrahydrofuran-2,5-diyl)bis(methylene) dimethanesulfonate (236.7 g, 821.7 mmol) and $NaN_3$ (270.0 g, 4.1094 mol) in DMSO (1.35 L) was heated overnight at 95° C. The reaction mixture was poured into ice-water and extracted with ethylacetate. The combined extracts were successively washed with water, aqueous $NaHCO_3$ solution, and brine, dried, and concentrated to give brown oil. The oil was diluted with brine and washed by ethylacetate, the organic layers was dried and concentrated to provide 166.5 g of 2,5-bis(azidomethyl)tetrahydrofuran as brown oil.

A mixture of 2,5-bis(azidomethyl)tetrahydrofuran (166.5 g) and Pd—C (10%, 10.8 g) in MeOH (2.7 L) was stirred overnight at room temperature under 1 atm $H_2$. The reaction mixture was filtered through celite and the filtrate was concentrated to provide 90 g of yellow oil (THFDA=2,5-bis(aminomethyl)tetrahydrofuran), which was checked by LC/MS and 1HNMR. The purity was determined at 96%. Further purification allow to get 98.2% purity. Cis/trans ratio is equal to 90/10.

Total yield: 75%.

Preparation of THFDA/DGEBA Thermosets

In order to evaluate the curing reaction of epoxy resins with diamines, differential scanning calorimetry (DSC) was used (DSC Q10 de TA Instruments). In a flask were vigourously blended at room temperature during 3 minutes 0.9095 g (proton equivalent Heq=32.5 g/eq) of 2,5-bis (aminomethyl)tetrahydrofuran at 98.2% (cis/trans ratio 90/10) with 5.1104 g of DGEBA DER331 from Dow Chemical (epoxy equivalent weight EEW=187 g/eq). The equivalent ratio proton:epoxy was equal to 1.005:1. Then, a sample of 8 mg of the blend was placed into a closed DSC cell (DSC=Differential Scanning calorimetry) and heated at 10° C./min from −60° C. to 200° C. under $N_2$. The temperature at which the heat flow of the reaction reached a maximum value was considered as the curing temperature: 104° C.

Then, sample was cooled in DSC at −20° C./min up to −50° C. A second heating was achieved at 10° C./min from −50° C. to 300° C. $T_g$ mid-point was measured and equal to 112° C.

Similar experiments were achieved according to the same process except that 2,5-bis(aminomethyl)tetrahydrofuran cis/trans 90/10 was replaced by meta-xylylene diamine (Sigma-Aldrich), 1,3-bis(aminomethyl)cyclohexane (Sigma-Aldrich), isophorone diamine (Sigma-Aldrich) and triethylenetetramine (Sigma-Aldrich) to get the equivalent ratio equal to 1.005:1. Respectively, curing temperature/$T_g$ mid-point were equal to 109° C./117° C., 101° C./135° C., 109° C. and 130° C. (two exothermic peaks)/149° C. and 95° C./99° C.

It appears from those data that THFDA is an excellent curing agent for preparing epoxy thermosets. THFDA based thermoset presents a curing temperature and a $T_g$ close to the ones obtained with meta-xylylene diamine (MXDA) as a curing agent.

Preparation of Parts of Cured Thermosets THFDA/DGEBA

Epoxy resin DGEBA DER331 from Dow Chemical (EEW=187 g/eq) was heated to 60° C. to decrease its viscosity. In a 50 mL flask, 22.700 g of DGEBA DER331 were added; then, 4.041 g of THFDA having a purity of 98.2% were added to this flask. Both components were mixed precautiously for 3 minutes to avoid the appearance of large bubbles. The mixture was then placed in a mold (10×3×0.3 $cm^3$) and then cured in an oven using the following curing process:

10 min to go from 25 to 80° C.
1 h at 80° C.
10 min to go from 80 to 180° C.
2 h at 180° C.

so as to obtain a mold.

Then, the mold was taken out the oven and let to cool down. Parts were recovered from the mold and cut to perform Dynamic Mechanical Thermal Analysis (DMTA) and water absorption measurements.

As a comparison, the same experiment was performed by replacing THFDA by MXDA (4.003 g of MXDA and 21.952 g of DGEBA DER331).

Thermo-mechanical properties (in particular, the elastic modulus E' and loss modulus E" against temperature T and the peak of tan(delta)=E"/E') were determined using a Rheometer ARES from TA Instruments set at 1 Hz, 0.1% of strain and a heating rate of 3° C./min from 40° C. to 200° C. The peak of tan(delta)=E"(T)/E'(T), also referred to as "maximum of tan(delta)", corresponds to the glass transition temperature of the material. It was measured to 114° C. for THFDA/DGEBA DER331 and 120° C. for MXDA/DGEBA DER331. We determined the elastic modulus at the plateau at T=150° C.: THFDA/DGEBA DER331 and MXDA/DGEBA DER331 materials were found to have exactly the same E'(150° C.), namely 3.6 MPa.

Water absorption analysis consisted in placing a part cut from the mold having a weight of about 4 g in water at 25° C. and in measuring the weight of the sample at different times. Water absorption a time t was calculated as follows:

$$\text{water absorption }(t)=[w(t)-w(t=0)]/w(t=0),$$

wherein w(t=0) was the initial weight of the sample before the analysis and w(t) was the weight of the sample at time t.

| | Water absorption (t = 24 h) | Water absorption (t = 48 h) | Water absorption (t =72 h) | Water absorption (t = 96 h) | Water absorption (t = 168 h) |
|---|---|---|---|---|---|
| THFDA/ DGEBA DER331 | 0.14% | 0.24% | 0.32% | 0.33% | 0.44% |
| MXDA/ DGEBA DER331 | 0.12% | 0.18% | 0.28% | 0.31% | 0.51% |

The testing of the above two samples showed surprisingly that THFDA, in spite of its non aromaticity, was as good as MXDA (i.e. water absorption was low in both cases). THFDA represents an interesting bio-based alternative to fossile MXDA.

Preparation of FDA/DGEBA Thermosets

In order to evaluate the curing reaction of epoxy resins with diamines, differential scanning calorimetry (DSC) was used (DSC Q10 from TA Instruments). In a flask were vigourously blended at room temperature during 3 minutes 0.337 g of 2,5-bis(aminomethyl)furan at 99% with 2 g of DGEBA DER331 from Dow Chemical (EEW=187 g/eq). Then, a sample of 8 mg of the blend was placed into a closed DSC cell (DSC=Differential Scanning calorimetry) and heated at 10° C./min from −60° C. to 200° C. under $N_2$. The temperature at which the heat flow of the reaction reached a maximum value was considered as the curing temperature: 98° C.

Then, sample was cooled in DSC at −20° C./min up to −50° C. A second heating was achieved at 10° C./min from −50° C. to 300° C.: Tg mid-point was measured and equal to 101° C.

Should the disclosure of any patents, patent applications, and publications which are incorporated herein by reference conflict with the description of the present application to the extent that it may render a term unclear, the present description shall take precedence.

The invention claimed is:

1. A curable composition comprising
    (a) at least one curing agent, wherein said curing agent is a derivative of 5-hydroxymethylfurfural corresponding to formula I

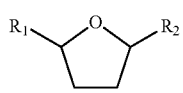

Formula I in which
$R_1$ and $R_2$ are both equal to —$(CH_2)_n$—$NH_2$,
n is equal to 1, 2 or 3;
and
    (b) at least one epoxy resin.

2. The curable composition according to claim 1, in which the curing agent is 2, 5-bis (aminomethyl)tetrahydrofuran.

3. The curable composition according to claim 1, in which curing agent (a) is the sole curing agent.

4. The curable composition according to claim 1, further comprising at least one dispersing agent.

5. A method for adhering at least two substrates comprising:
    applying the curable composition according to claim 1 to one or both of the substrates; and
    bringing the substrates into a contacting relationship.

6. The method according to claim 5, further comprising curing the epoxy resin.

7. The method according to claim 6, wherein the curing is made at a temperature comprised between −25° C. and 200° C.

8. A process for the manufacture of an epoxy thermoset comprising:
    forming a curable prepolymer composition comprising a prepolymer, which is the reaction product of at least one epoxy resin with at least one curing agent represented by Formula I below:

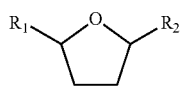

Formula I where $R_1$ and $R_2$ are both equal to —$(CH_2)_n$—$NH_2$, n is equal to 1, 2 or 3; and
reacting the curable prepolymer composition with at least one epoxy resin.

9. An epoxy thermoset obtained by the process according to claim 8.

* * * * *